United States Patent
Byers et al.

[11] Patent Number: 5,607,039
[45] Date of Patent: Mar. 4, 1997

[54] VARIABLE COMPRESSIBILITY ROLLER

[75] Inventors: Joseph L. Byers, Inman; Roger D. Meadows, Moore, both of S.C.

[73] Assignee: Reeves International, Spartanburg, S.C.

[21] Appl. No.: 587,077

[22] Filed: Jan. 16, 1996

[51] Int. Cl.$^6$ .................................................. B65G 13/00
[52] U.S. Cl. .................................................................. 193/37
[58] Field of Search .............................. 193/37; 198/785; 492/48, 56

[56] References Cited

U.S. PATENT DOCUMENTS

| | | | |
|---|---|---|---|
| 199,712 | 1/1878 | Stevens et al. | 193/37 |
| 2,187,250 | 1/1940 | Sendzimir | 80/38 |
| 3,254,818 | 6/1966 | Jacobsen | 226/3 |
| 3,367,479 | 2/1968 | Letson et al. | 198/785 |
| 3,786,549 | 1/1974 | Pott | 29/116 |
| 4,378,622 | 4/1983 | Pinkston et al. | 29/148.4 |
| 4,566,162 | 1/1986 | Brands | 26/105 |
| 4,656,702 | 4/1987 | Tsuchida | 26/75 |
| 4,697,728 | 10/1987 | Sawyer, Sr. et al. | 226/196 |
| 4,785,514 | 11/1988 | Kannwischer | 29/116.1 |
| 4,790,428 | 12/1988 | Ramsey | 198/840 |
| 4,910,845 | 3/1990 | Delhaes | 193/37 X |
| 4,949,445 | 8/1990 | Van Der Meulen et al. | 29/117 |
| 5,206,992 | 5/1993 | Carlson et al. | 29/895.32 |
| 5,244,138 | 9/1993 | Blanding et al. | 226/174 |
| 5,381,887 | 1/1995 | Emmons | 193/37 X |
| 5,415,612 | 5/1995 | Carlson et al. | 492/56 |

FOREIGN PATENT DOCUMENTS

| | | | |
|---|---|---|---|
| 1217866 | 5/1966 | Germany | 193/37 |
| 4148713 | 5/1992 | Japan | 193/37 |

*Primary Examiner*—James R. Bidwell
*Attorney, Agent, or Firm*—Pennie & Edmonds

[57] ABSTRACT

The present invention relates to a variable compressibility layer in rollers or flat pulleys. The present invention provides a smooth-surface roller that will "spread" a web being conveyed by a roller, or urge flattening and prevention of wrinkles in the web. It will also assist in the centering of the web being conveyed on web-handling equipment. If a roller is small, it may be used as a flat pulley, wherein the present invention causes a belt to track in the center of the pulley.

20 Claims, 3 Drawing Sheets

5,607,039

VARIABLE COMPRESSIBILITY ROLLER

FIELD OF THE INVENTION

The present invention relates to a new construction for variable compressibility rollers or flat pulleys. More particularly, the present rollers or roll coverings spread or urge flattening and prevention of wrinkles in a web which is being conveyed. If a roller is small, it may be used as a flat pulley. The invention further relates to methods of making such devices.

BACKGROUND OF THE INVENTION

Various devices or features have been used over the years to center and/or flatten a web which is being conveyed. The most common such devices or features are the bowed "Mount Hope" rolls, named for a pioneer supplier of this concept. Another manufacturer provides roll coverings which include spiral grooves having groove sides that are ground at an angle, with opposite leads from the center to the ends. This construction is shown in FIGS. 1 and 2.

The grooved roller of FIG. 1 has a central support 1, or core, that is typically surrounded by a roll cover 2, or outer layer, and that has a plurality of grooves 3 to spread a web. The prior art grooves cause several problems, such as: increased manufacturing costs in milling the roll cover or outer layer, a rough surface that is more likely to tear fragile webs, and grooves that collect dirt from the environment or even pieces of the web itself. FIG. 2 indicates a cross-section of a portion of the roll cover, or outer layer to further illustrate the complexity of the grooves.

In an attempt to prevent damage to light and fragile webs, that manufacturer also supplies multiple-lead finer grooves to attempt web spreading. Other manufacturers weld a solid wire in a spiral configuration around the external surface of a steel roll, with the spiral lead reversed from the center to the opposing ends. Existing rollers with grooves, wires, or other discontinuous surfaces run the risk of damaging or leaving dirt marks on the web.

The manufacture of rolls with such grooves or spiral wire welds requires additional cost and effort when producing the rolls. It has been desired in the field to produce a flat roll or roller that would have the additional effect of preventing wrinkles from forming in a web or of removing wrinkles that form during handling of the web. The present invention provides one such class of devices which achieve the desired performance.

SUMMARY OF THE INVENTION

The present invention relates to a web conveying article with a first layer, having an inner and an outer surface, with the outer surface being substantially smooth so that the article has a substantially constant outer diameter; a second layer, having an outer and an inner surface, the outer surface being an inverse of the inner surface of the first layer, with one of the layers being a compressible layer which is thicker at the ends of the web conveying article than in the center; and a rotatable support, wherein each of the layers is in concentric relation about the rotatable support. The article may further have a base layer, concentrically arranged about the rotatable support, having an outer surface for supporting the first and second layers.

In one preferred embodiment, the compressible layer of the article is a foam of a polyurethane, a thermoplastic polymer, or an elastomer. In another preferred embodiment, the compressible layer has a concave curved shape in cross-section. In yet another preferred embodiment, the compressible layer has at least one step between relatively thicker and relatively thinner regions. Other preferred embodiments include those wherein: the thickness of the center portion of the compressible layer is zero; the compressible layer has a thickness which constantly decreases inwardly toward the center portion of the article to a minimal or zero thickness; the compressible layer has a wide U-shaped cross-section, wherein substantially all of the center portion of the foam has essentially the same minimal thickness; and the compressible layer has at least one relatively thicker and one relatively thinner region, wherein each region progressively inward toward the center portion of the article is connected by a constantly decreasing thickness of the compressible layer.

In preferred embodiments, the article is in the form of a roller or of a flat pulley.

A method of manufacturing a web conveying article includes the steps of: providing a rotatable support; providing a first layer concentrically about the rotatable support; and providing a second layer concentrically about the first layer to form a web conveying article having a substantially smooth outer surface so that the article has a substantially constant outer diameter, wherein one of the first and second layers is a compressible layer that is shaped with a greater thickness near its ends and with a reduced thickness in its central portion. This method may further include adding a base layer, which is concentrically arranged about the rotatable support, before providing the second and first layers.

In a preferred embodiment of this method, the compressible layer is a foam of a polyurethane, a thermoplastic polymer, or an elastomer. The method would include providing the compressible layer with a concave curved shape in cross-section. Other preferable embodiments of the method further include: providing the compressible layer with at least one step between relatively thicker and relatively thinner regions; reducing the thickness of at least part of the center portion of the compressible material to zero; providing for the thickness of the compressible layer to constantly decrease inwardly toward the center portion of the article to a minimal or zero thickness; providing the compressible layer with a wide U-shaped cross-section, wherein substantially all the center portion of the foam is of essentially the same minimal thickness; and providing the compressible layer with at least one relatively thicker and one relatively thinner region, wherein each region progressively inward toward the central portion of the article is connected by a constantly decreasing thickness of the compressible layer. Each region progressively inward from the ends of the article may be connected by a constantly decreasing thickness of compressible material or foam.

BRIEF DESCRIPTION OF THE DRAWINGS

Further features and advantages of the invention can be ascertained from a review of the following detailed description which is provided in connection with the attached drawings, wherein.

DESCRIPTION OF THE PREFERRED EMBODIMENTS

Figure 1:
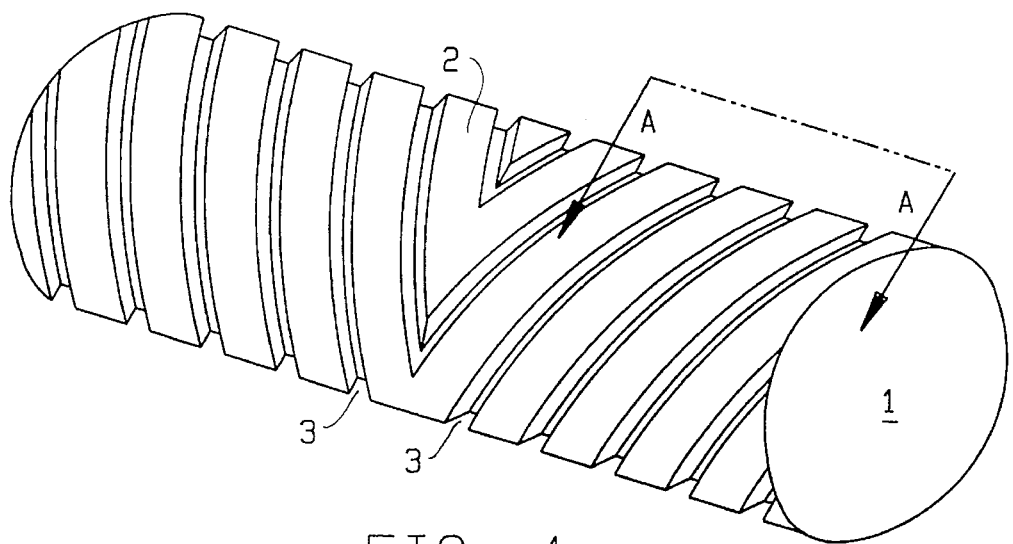
FIG. 1 illustrates a grooved roller according to the prior art.
Figure 2:
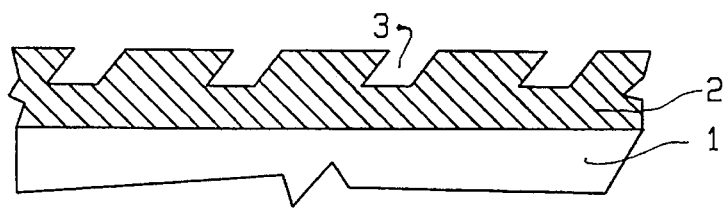
FIG. 2 is a partial cross-sectional view of the roller of FIG. 1 taken along the lines A—A thereof.

The roll or roll covering of the invention has a smooth, constant diameter surface, which at the same time provides a variable compressibility or spring rate across the web by being harder or stiffer in the middle and softer on the ends. Thus, the roll will effectively have a variable crown that will self-adjust to fit the tension being applied by the web, yet still have a smooth surface. The higher the tension becomes, the more apparent will be the crown. As the roller surface compresses a variable amount, the face of the roller assumes a convex shape, effectually becoming longer across the width. Looking at the cross-section of this shape, the surface becomes an arc, which is longer than the chord it was before load was applied. Use of this principle in a flat belt pulley occurs in the same manner, where the flat belt pulley is essentially a short or thin roller.

The present invention is useful in every industry where webs are conveyed, particularly in the textile, paper, and converting industries. As the devices of the present invention provide a relatively smooth outer surface that is free from depressions or distortions, the collection of dirt or debris is substantially avoided, as is the possibility of damaging or leaving marks on the web.

The rollers or flat pulleys of the invention are manufactured with a rotatable support, core, or mandrel surrounded by a base layer and a compressible or foam layer having a particular shape in cross-section. This center support is preferably made of steel, although other metals, fiber reinforced plastics, or even wood may be substituted. The center support must be cleaned before any layers are applied upon or bonded to it.

The present invention is advantageously manufactured with a base layer. Useful materials for the base layer include a wide variety of elastomers and polyurethanes. The outermost concentric layer is typically manufactured of the same material used for the base layer, with polyurethanes or elastomers such as vulcanized rubber being preferred.

The foam or compressible layer that contacts the base layer must have voids and must be flexible. To be compressible, a portion of solid material is replaced by gas, generally air. More specifically, the layers beneath the surface of the blanket are constructed so as to contain millions of minute voids, which permit uniform compression to occur. As the voids beneath the area under pressure reduce in volume, they permit vertical compression, rather than lateral bulging, to take place. The compressible layer may be rubber, which may be vulcanized, or any other thermoplastic or elastomer that has voids and flexibility. Those skilled in the art are well aware of how to make a wide variety of compressible layers, such as open cell structures, closed cell structures, microspheres, and various combinations thereof, as evidenced by the teachings of Flint et al., U.S. Pat. No. 5,364,683; as well as Larson, U.S. Pat. No. 4,042,743; Shimura, U.S. Pat. No. 4,442,895; Rhodarmer et al., U.S. Pat. No. 3,795,568; Pinkston et al., U.S. Pat. No. 4,015,046; Burns, U.S. Pat. No. 5,069,958; and Byers, U.S. Pat. No. 5,334,418. These patents are expressly incorporated herein by reference to the extent necessary to understand the variations of how the compressible layer can be formed.

Figure 3:
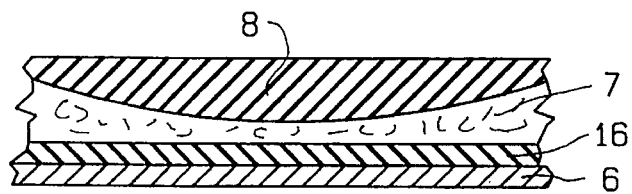
FIG. 3 illustrates a preferred embodiment of a roller according to the invention, wherein a parabolic concave cross-section is ground into the soft foam or other compressible material.

Preferably, this compressible layer will be foamed polyurethane. This compressible or foam layer is inserted during construction, then usually ground to a desired construction, e.g., a parabolic concave cross-section as shown in FIG. 3, before adding the outer covering made of a conventional polyurethane or elastomeric material that is suitable for handling webs. This compressible layer is connected to the base layer via bonding during vulcanization, but the layers may also be connected by using a two part foam urethane that cures as it is extruded.

Several methods that are well known in the art exist to make the variable compressibility inner layer. One method is injection molding of the compressible layer, where the raw material is injected into a mold of the desired shape and heat treated or cured. A second method is compression, where a curing agent is applied to the rubber, the rubber is placed in a mold of the desired shape, and a press is used to compress the mold. In a third method, called reaction injection molding (RIM), the curing agent and a polymer are injected together with a foaming agent into a mold of the desired shape. A fourth method involves application of sheets of rubber that will foam around the core, where the rubber is wrapped with a textile under tension so as to keep the ultimate desired shape and then placed in an autoclave or other heat source for curing. Yet another method includes extruding a strip with a long elliptical or belt shaped cross-section spirally around a rotating core to build the layer to the desired shape. A sixth method uses liquid strip extrusion, where a liquid strip of polyurethane is cured after being extruded from a mixing head that traverses the length of the constantly rotating roller to prevent dripping. In the embodiment where there are a plurality of graduated steps, a seventh method of forming the variable compressibility inner layer is to place pre-cured rubber strips of appropriate thickness onto the roller. In these methods, grinding will usually be necessary to obtain the desired shape, except where molds are used.

An outermost layer is usually placed concentrically surrounding the shaped compressible layer, although in rare situations the outermost layer may be avoided. This outermost layer is made of an elastomer that is shaped on the inner surface to correspond to the cross-section of the compressible layer and shaped flat on the outer surface. More preferably, the outer layer is made of polyurethane or vulcanized rubber. The outer layer may be avoided in certain situations where the base layer is shaped by the above mentioned methods so that the compressible layer is the first, or outermost, layer and the second, or base, layer contacts the rotatable support. In that case, the compressible layer has an outer face that is substantially smooth and has a substantially constant diameter, and the base layer is shaped to correspond to the shaped inner surface of the compressible layer. Avoidance of the outer layer may be worthwhile in certain situations where there is minimal abrasion by the web material, the web conveys a thin or light material, or the web operates at low speeds. The present invention therefore desirably obtains the benefits of a smooth-surface web conveyor without suffering the drawbacks inherent in the prior art.

The preferred embodiment of the variable compressibility roller is set forth below. The base layer would preferably be comprised of nitrile rubber of 0.10 to 0.75 inches thickness contacting a rotatable support made of a material such as steel. A second layer of variably compressible material, such as a cellular nitrile rubber ground into a parabolic concave profile, would preferably have a difference in diameter of approximately 0.030 to 0.30 inches and a thickness of approximately 0.10 inches at the thinnest point. The first layer, concentrically arranged around the second layer, would preferably be comprised of a nitrile rubber having a thickness of 0.1 to 0.25 inches at its thinnest point. The base and second layers and the second and first layers are most preferably connected by vulcanization. The web conveying article would preferably have a total outside diameter of approximately 4 inches and a length of 36–48 inches.

The invention is designed to spread a web being conveyed or to urge the flattening and prevention of wrinkles in the web. It will also assist in centering of the web being conveyed on web-handling equipment. In the embodiment of a flat pulley, the invention will cause a flat belt to track in the center of the pulley, or short roller, without the use of grooves, slots or other mechanical designs. For example, such a device could be used to make flat belts track smoothly in a combustion engine.

In the several variations of the invention, the particular shape of the outer surface of the variable compressibility inner layer and the inversely shaped inner surface of the outer layer are designed to further the objectives of the invention.

FIG. 3 illustrates a preferred embodiment wherein the second layer is the variable compressibility layer 7, or foam layer, which has a parabolic concave cross-section. This second layer is arranged concentrically about the base layer 16, which itself is arranged concentrically about the rotatable support 6. In each embodiment shown in the figures, the inner surface of the first layer will have the inverse of the particular shape of the outer surface of the second layer. In this embodiment, the first layer 8 is the outermost layer, which has a parabolic convex cross-section.

Figure 4:
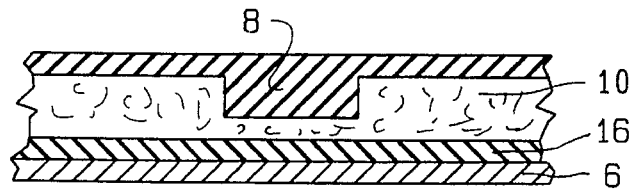
FIG. 4 illustrates another preferred embodiment of a roller according to the invention, wherein at least one relatively thicker and one relatively thinner region is ground into the foam.

FIG. 4 illustrates a preferred embodiment wherein the second layer is the variable compressibility inner layer 10, which has a plurality of graduated steps, or a stepped configuration. This second layer is arranged concentrically about the base layer 16. The first layer 8 inversely corresponds to this particular shape.

Figure 5:
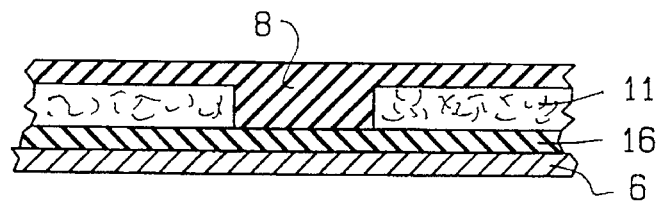
FIG. 5 illustrates another preferred embodiment of a roller according to the invention, having a cross-section where no foam is in the center portion of the roller.

FIG. 5 illustrates a preferred embodiment wherein the first layer is the variable compressibility inner layer 11, which lies on both sides of, and between, the outer layer 8, and which contacts the base layer 16 in the center portion. The base layer here is also arranged concentrically about the rotatable support 6. The thickness of the second layer, which is the variable compressibility layer in this embodiment, is zero in the center portion of the article, such that the outer surface may contact the base layer 16.

Figure 6:
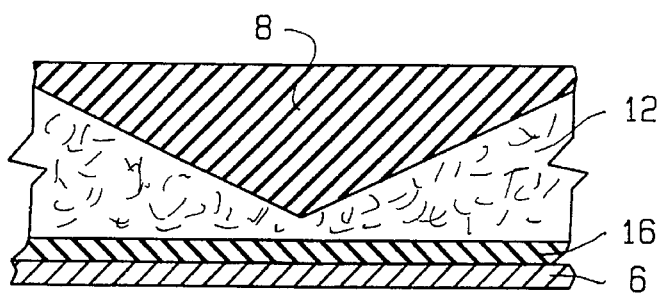
FIG. 6 illustrates yet another preferred embodiment of a roller according to the invention, having a cross-section where the thickness of foam constantly decreases inwardly from the end portions of the roller.

FIG. 6 illustrates a preferred embodiment wherein the second layer 12 is of variable compressibility which constantly decreases inwardly toward the center portion of the article to a minimal or zero thickness. Here, the compressible or foam layer has a V-shaped configuration.

Figure 7:
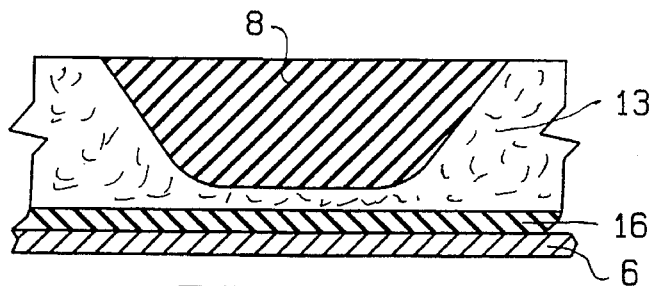
FIG. 7 illustrates another preferred embodiment of a roller according to the invention, wherein a U-shaped cross-section is ground into the foam.

FIG. 7 illustrates a preferred embodiment wherein the outer surface of the second layer 13, which is the variable compressibility layer in this embodiment, has a wide U-shaped cross-section, wherein substantially all the center portion of the compressible or foam layer is the same minimal thickness. Most of the center portion of the U-shape thus has a minimal thickness.

Figure 8:
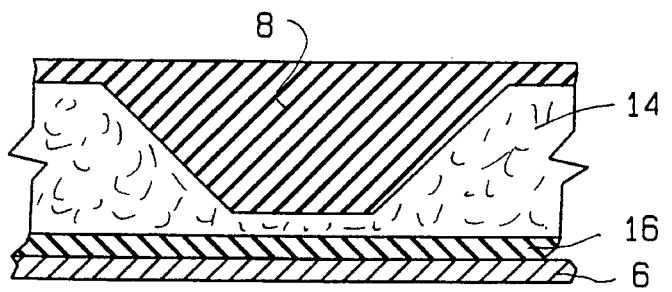
FIG. 8 illustrates another preferred embodiment of a roller according to the invention, wherein at least one relatively thicker and one relatively thinner region is ground into the foam.

FIG. 8 illustrates a preferred embodiment wherein the outer surface of the second layer 14, which is of variable compressibility, has at least one relatively thicker and one relatively thinner region, wherein each region progressively inward toward the middle portion of the article is connected by a constantly decreasing thickness of the outer surface of the inner layer. This permits the compressible material or foam to be shaped into a notch configuration with symmetrical regions of a given thickness connected by a downwardly sloping ramped configuration toward the middle portion of the article.

Figure 9:
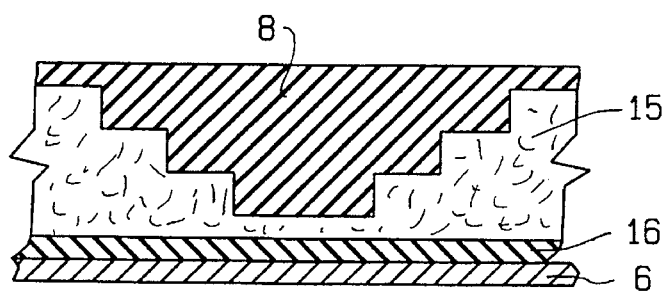
FIG. 9 illustrates another embodiment of a roller according to the present invention, wherein a stepped profile is ground into the foam.

FIG. 9 illustrates a preferred embodiment wherein the second layer 15 is of variable compressibility and has a plurality of graduated steps, or a stepped configuration similar to FIG. 4.

Other variations may be envisioned where the ultimate shape has a thicker variable compressibility second layer towards the ends of the article and a relatively less thick inner layer toward the middle portion of the article.

Figure 10:
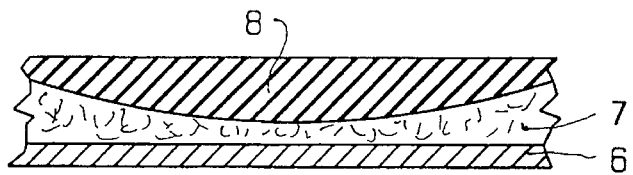
FIG. 10 illustrates an embodiment where no base layer is present and the second layer has variable compressibility and concentrically contacts the rotatable support 6, wherein the variable compressibility layer is shaped into a profile as in one of the embodiments shown in FIGS. 3–9.

FIG. 10 illustrates a preferred embodiment wherein a rotatable support, and a first and second layer act in concert to form a roller or flat pulley. No base layer 16 is present here, yet the second layer is of variable compressibility, concentrically contacts the rotatable support 6, and is shaped as in one of the embodiments shown in FIGS. 3–9.

Figure 11:
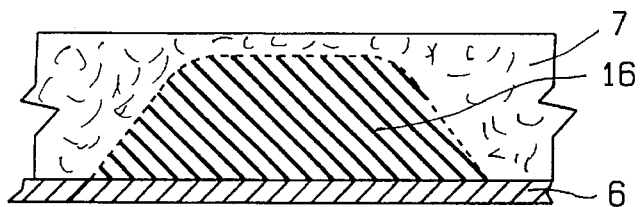
FIG. 11 illustrates an embodiment where no base layer is present, the first layer has variable compressibility and the second layer concentrically contacts the rotatable support 6, wherein the variable compressibility layer is shaped into a profile as shown in one of the embodiments shown in FIGS. 3–9.

FIG. 11 illustrates a preferred embodiment wherein a rotatable support, and a first and second layer act in concert to form a roller or flat pulley. No base layer is present here, yet the first layer is of variable compressibility shaped as in one of the embodiments shown in FIGS. 3–9 and the second layer 16 is made of a material the base layer would normally be made and concentrically contacts the rotatable support 6, where the second layer is shaped to the inverse of the first layer of variable compressibility material.

Figure 12:
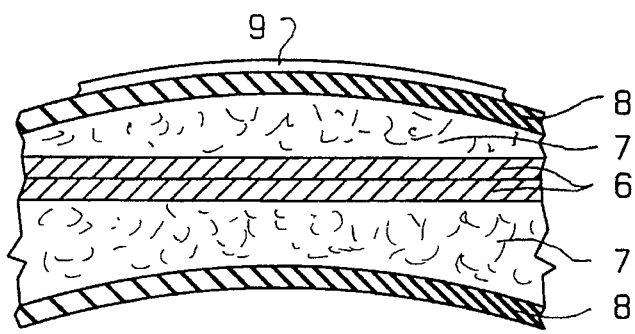
FIGS. 12 and 13 illustrate a web being transferred by a roller in accordance with the present invention by way of longitudinal and radial cross-sectional views, respectively, of the roller and web.
Figure 13:
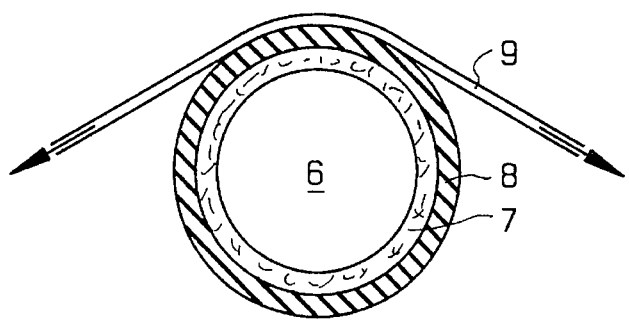
Figure 1:
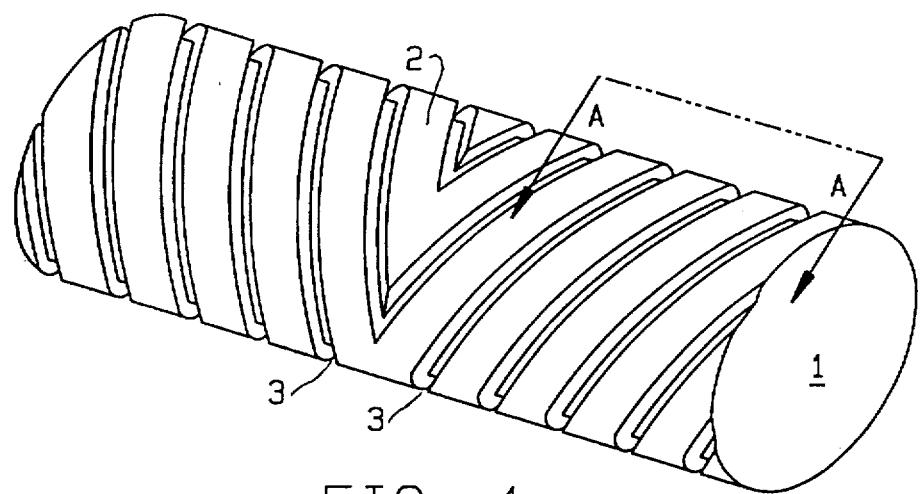
Figure 2:
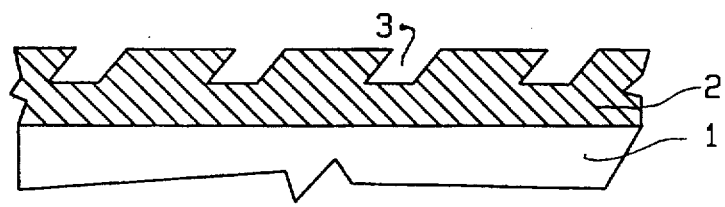
Figure 3:
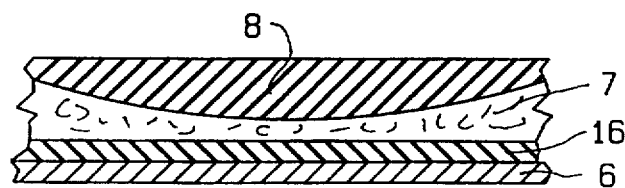
Figure 4:
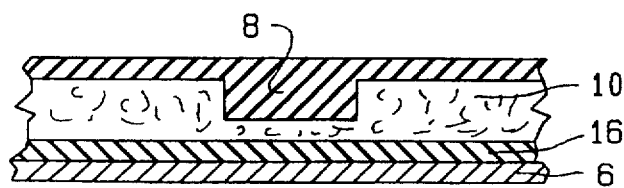
Figure 5:
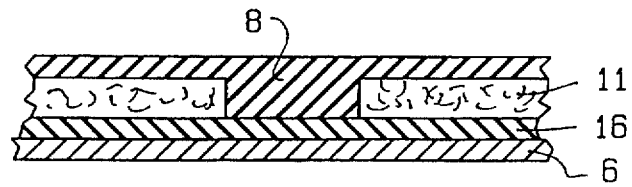
Figure 6:
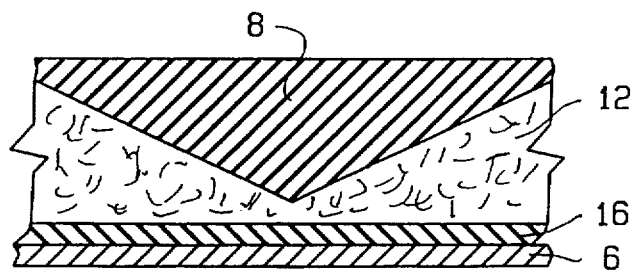
Figure 7:
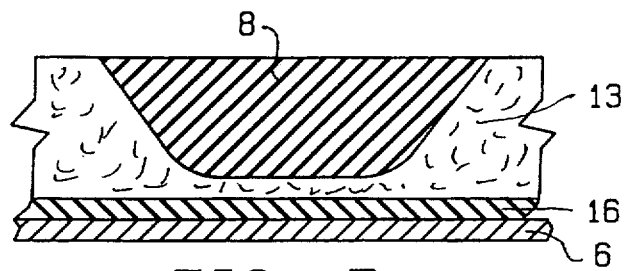
Figure 8:
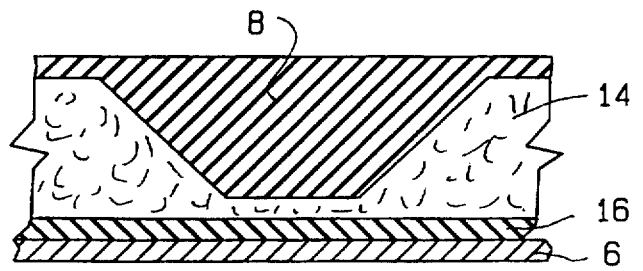
Figure 9:
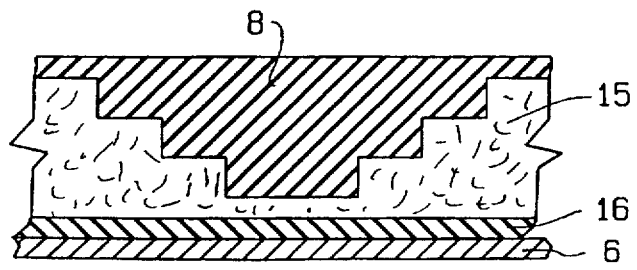
Figure 10:
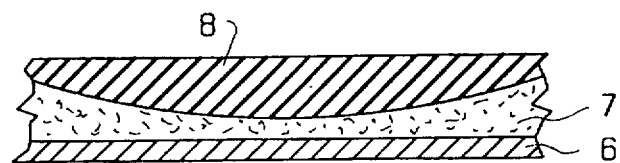
Figure 11:
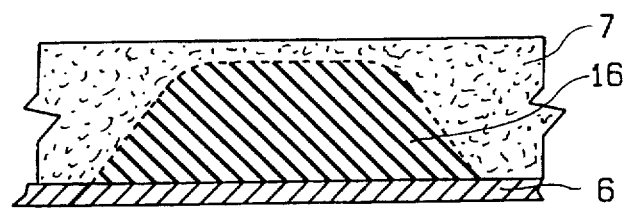
Figure 12:
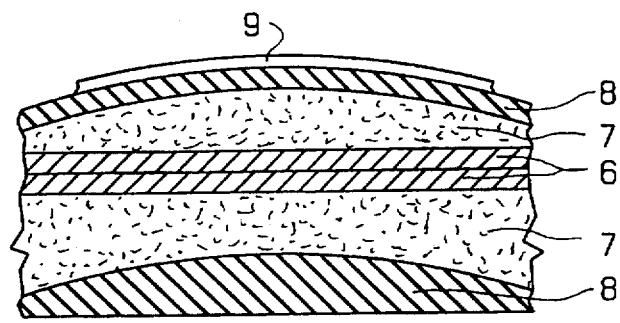
Figure 13:
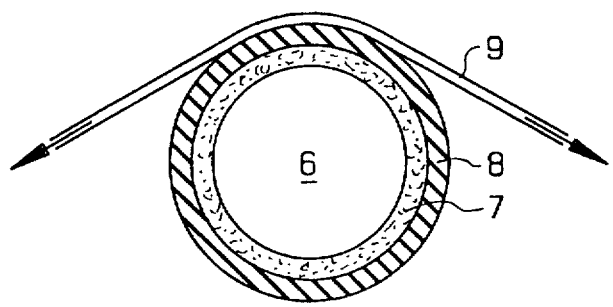

FIGS. 12 and 13 show a web exerting pressure on the present invention. The rotatable support 6 is covered by a variable compressibility second layer 7 made of foam. This variable compressibility second layer 7 compresses when the pressure of a web 9 is placed on top of the roller or flat pulley. The outer surface of the variable compressibility second layer 7 contacts the inner surface of the first layer 8. These layers and rotatable central support 6 cooperate to form a web conveying article.

The present invention thus provides a new variable compressibility roller or flat pulley that is less expensive to manufacture, has a smooth surface, and still flattens or prevents flattening of a web. It is to be recognized and understood that the invention is not to be limited to the exact configuration as illustrated and described herein. Accordingly, all expedient modifications readily attainable by one versed in the art from the disclosure set forth herein that are within the scope and spirit of the present invention are to be included as further embodiments of the present invention. The scope of the present invention accordingly is to be limited as set forth in the claims.

What is claimed is:

1. A web conveying article comprising:

a first layer, having an inner and an outer surface, with the outer surface being substantially smooth so that the article has a substantially constant outer diameter;

a second layer, having an outer and an inner surface, the outer surface being an inverse of the inner surface of the first layer, with one of the layers being a compressible layer of a thermoplastic or elastomeric material which contains voids therein, which layer is thicker at the ends of the web conveying article than in the center; and a rotatable support, wherein each of the layers is in concentric relation about the rotatable support.

2. The article of claim 1, further comprising a base layer, concentrically arranged about the rotatable support, and having an outer surface for supporting the first and second layers.

3. The article of claim 1 or 2 wherein the material of the compressible layer is selected from the group consisting of a polyurethane, a thermoplastic polymer, or an elastomer.

4. The article of claim 1 or 2 wherein the compressible layer has a concave shape in cross-section.

5. The article of claim 1 or 2 wherein the compressible layer has at least one step between relatively thicker and relatively thinner regions.

6. The article of claim 1 or 2 wherein the thickness of the center portion of the compressible layer is zero.

7. The article of claim 1 or 2 wherein the compressible layer has a thickness which constantly decreases inwardly toward the center portion of the article to a minimal or zero thickness.

8. The article of claim 1 or 2 wherein the compressible layer has a wide U-shaped cross-section, wherein substantially all of the center portion of the foam has essentially the same minimal thickness.

9. The article in claim 1 or 2 wherein the compressible layer has at least one relatively thicker and one relatively thinner region, wherein each region progressively inward toward the center portion of the article is connected by a constantly decreasing thickness of the compressible layer.

10. The article of claim 1 or 2 in the form of a roller.

11. The article of claim 1 or 2 in the form of a flat pulley.

12. A method of manufacturing a web conveying article comprising the steps of:

providing a rotatable support;

providing a first layer concentrically about the rotatable support; and providing a second layer concentrically about the first layer to form a web conveying article having a substantially smooth outer surface so that the article has a substantially constant outer diameter, wherein one of the first and second layers is a compressible layer of a thermoplastic or elastomeric material which contains voids therein, which layer is shaped with a greater thickness near its ends and with a reduced thickness in its central portion.

13. The method of claim 12, further comprising adding a base layer, which is concentrically arranged about the rotatable support, before providing the first and second layers.

14. The method of claim 12 or 13 wherein the material of the compressible layer is selected from the group consisting of a polyurethane, a thermoplastic polymer, or an elastomer.

15. The method of claim 12 or 13 which further comprises providing the compressible layer with a concave curved shape in cross-section.

16. The method of claim 12 or 13 which further comprises providing the compressible layer with at least one step between relatively thicker and relatively thinner regions.

17. The method of claim 12 or 13 which further comprises reducing the thickness of at least part of the center portion of the compressible material to zero.

18. The method of claim 12 or 13 which further comprises providing for the thickness of the compressible layer to constantly decrease inwardly toward the center portion of the article to a minimal or zero thickness.

19. The method of claim 12 or 13 which further comprises providing the compressible layer with a wide U-shaped cross-section, wherein substantially all the center portion of the compressible layer is of essentially the same minimal thickness.

20. The method of claim 12 or 13 which further comprises providing the compressible layer with at least one relatively thicker and one relatively thinner region, wherein each region progressively inward toward the central portion of the article is connected by a constantly decreasing thickness of the compressible layer.

* * * * *

UNITED STATES PATENT AND TRADEMARK OFFICE
CERTIFICATE OF CORRECTION

| | | |
|---|---|---|
| PATENT NO. | : 5,607,039 | Page 1 of 4 |
| DATED | : March 4, 1997 | |
| INVENTOR(S) | : Joseph L. Byers, et al. | |

It is certified that error appears in the above-identified patent and that said Letters Patent is hereby corrected as shown below:

The sheets of Drawings consisting of figures 1-13 should be deleted to appear as per attached figures 1-13.

Signed and Sealed this

Fifteenth Day of July, 1997

*Attest:*

BRUCE LEHMAN

*Attesting Officer*     *Commissioner of Patents and Trademarks*